US008355153B2

(12) United States Patent
Kerz

(10) Patent No.: US 8,355,153 B2
(45) Date of Patent: Jan. 15, 2013

(54) COMPACT REGISTER MARK

(75) Inventor: Ludo Kerz, Nieder-Olm (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 517 days.

(21) Appl. No.: 12/617,913

(22) Filed: Nov. 13, 2009

(65) Prior Publication Data

US 2010/0118317 A1 May 13, 2010

(30) Foreign Application Priority Data

Nov. 13, 2008 (DE) ......................... 10 2008 057 150

(51) Int. Cl.
*G06F 15/00* (2006.01)
*G03G 15/01* (2006.01)

(52) U.S. Cl. ......................................... 358/1.15; 399/39

(58) Field of Classification Search .................. 358/1.15
See application file for complete search history.

(56) References Cited

U.S. PATENT DOCUMENTS

| | | | |
|---|---|---|---|
| 4,273,045 | A | 6/1981 | Crowley |
| 4,534,288 | A | 8/1985 | Brovman |
| 4,679,071 | A | 7/1987 | Kitagawa |
| 4,963,029 | A | 10/1990 | Kipphan |
| 5,056,430 | A | 10/1991 | Bayerlein et al. |
| 5,608,496 | A | 3/1997 | Hanzawa et al. |
| 5,696,890 | A | 12/1997 | Geissler et al. |
| 5,909,235 | A | 6/1999 | Folkins |
| 6,022,154 | A | 2/2000 | Allen |
| 6,118,950 | A | 9/2000 | Wibbels et al. |
| 6,553,906 | B1 | 4/2003 | Bucks et al. |
| 7,170,648 | B2 | 1/2007 | Pilloud |
| 2008/0115679 | A1 * | 5/2008 | Petersen ....................... 101/211 |

FOREIGN PATENT DOCUMENTS

| | | | |
|---|---|---|---|
| DE | 3513717 | A1 | 11/1985 |
| DE | 3809941 | A1 | 10/1988 |
| DE | 3719766 | A1 | 12/1988 |
| DE | 4335350 | A1 | 4/1995 |
| DE | 10023751 | A1 | 1/2001 |
| DE | 102006036587 | A1 | 2/2008 |
| EP | 0653308 | A2 | 5/1995 |
| EP | 0744669 | A2 | 11/1996 |
| EP | 1199168 | A1 | 4/2002 |
| EP | 1219420 | A1 | 7/2002 |
| JP | 2000238242 | A | 9/2000 |
| JP | 2002192702 | A | 7/2002 |

OTHER PUBLICATIONS

German Search Report dated Jul. 20, 2009.

* cited by examiner

*Primary Examiner* — Saeid Ebrahimi Dehkordy

(74) *Attorney, Agent, or Firm* — Laurence A. Greenberg; Werner H. Stemer; Ralph E. Locher

(57) ABSTRACT

A register control mark for the detection of positional deviations between at least two color separations printed over one another on a printing material in multicolor printing. The control mark has a pattern with parallel lines of a first color separation and, printed in parallel over the pattern, at least two parallel lines of a second color separation.

10 Claims, 3 Drawing Sheets

COMPACT REGISTER MARK

CROSS-REFERENCE TO RELATED APPLICATION

This application claims the priority, under 35 U.S.C. §119, of German patent application DE 10 2008 057 150.4, filed Nov. 13, 2008; the prior application is herewith incorporated by reference in its entirety.

BACKGROUND OF THE INVENTION

Field of the Invention

The present invention relates to a control mark for the detection of positional deviations between at least two color separations printed over one another on a printing material during multicolor printing.

In particular during offset printing but also during other types of multicolor printing, the printing quality depends substantially on the individual color separations being printed exactly over one another. In this case, deviations in the range from about 100 micrometers to a few millimeters are involved. In order to check the printing quality, it is therefore important to be able to identify positional deviations of the individual color separations in relation to one another on the printing material unambiguously, in order if necessary to be able to correct and eliminate these deviations by changing the settings in the press. The monitoring and control operation can in this case be carried out either manually or completely automatically. In the case of manual inspection, use is normally made of color register and position register control marks, with which the print operator can detect visually whether the individual color separations have been displaced with respect to one another. For this purpose, the control marks are configured in such a way that positional deviations can be detected both in the circumferential direction and in the lateral direction on the printing material. For this purpose, use is normally made of parallel line patterns, which have to be assigned to a first color separation. A second color separation then has a parallel line, which is printed over the parallel lines of the pattern of the first color separation. If this printed line of the second color separation is located in the middle of the line pattern of the first color separation, then the color register and the position register have been set perfectly. If the line of the second color separation does not come to lie in the middle of the pattern of the first color separation, there is a positional deviation, which must be controlled out. The press operator is then able to read off this deviation by using the printed lines and enter it into the color register and position register control system of the press.

In the meantime, there are a large number of position register marks which are used to detect the deviations in the circumferential, lateral and diagonal direction. Position register and color register marks of the type are described, for example, in Japanese patent JP 2002-192702. There, there are disclosed primarily marks which are configured in an angled form and thus permit positional deviations in the circumferential and lateral direction to be read off.

The problem with the prior art position and color register marks is the space that is required. In order to be able to detect the positional deviation of the color separations in relation to one another, the pattern having the parallel lines of the first color separation normally has to have a length of at least four millimeters, in order to be able to detect corresponding positional deviations and display them visually. In particular if the position and color register marks are present many times in the lateral or circumferential direction on the printing material, in order for example also to be able to take into account and to detect the paper expansion as a result of moisture during printing, the space required by the previously known position and color register marks is a hindrance.

SUMMARY OF THE INVENTION

It is accordingly an object of the invention to provide a register control mark which overcomes the above-mentioned disadvantages of the heretofore-known devices and methods of this general type and which provides for a control mark for the detection by the printer of positional deviations between at least two color separations on a printing material during multicolor printing which needs less space than the prior art conventional control marks.

With the foregoing and other objects in view there is provided, in accordance with the invention, a control mark for detecting positional deviations between at least two color separations printed over one another on a printing material in a multicolor printing process, the control mark comprising:

a pattern having a plurality of mutually parallel lines of a first color separation arranged to form a readable scale; and at least two mutually parallel lines of a second color separation printed in parallel over said pattern.

In other words, the objects of the invention are achieved in that there is provided a register control mark for the detection of positional deviations between at least two color separations having a pattern with parallel lines of a first color separation. This first color separation is normally designated as standard color, since this is the reference color to which the other color separations are controlled and set. The standard color, and therefore the first color separation, is normally the color black. In the case of the control mark according to the invention, in addition to the pattern of the first color separation, at least two parallel lines of a second color separation are printed in parallel over precisely this pattern. In a corresponding way, two parallel lines of the respective color separation are also printed for all further color separations. The use of at least two parallel lines in the color separations on the other side of the standard color has the great advantage that the pattern having the parallel lines of the first color separation can be reduced in size. In order to be able to detect the positional deviations on the control mark on the printing material, the lines of the second and the further color separations must specifically come to lie within the pattern having the parallel lines of the first color separation. Otherwise, the parallel lines of the further color separations are located outside the pattern of the first color separation and therefore outside the printed scale, so that it is not possible to read off positional deviations. As a result of using at least two parallel lines of the further color separations, however, the reading-off range is widened, since in this case it is sufficient if one of the two parallel lines of the further color separations comes to lie within the pattern having the parallel lines of the first color separation. In this case, for example, one parallel line of the second color separation is assigned positive deviations, and the other parallel line of the second color separation is assigned negative deviations. In this way, it is possible to halve the length of the pattern having the parallel lines of the first color separation. Of course, it is also possible to print more than two parallel lines from the second and the further color separations, in order to be able to reduce the size of the control mark correspondingly further.

In accordance with an added feature of the invention, provision is made for the at least two parallel lines of the second color separation to have the same spacing from one another as the length of the pattern having the parallel lines of the first color separation. In such a refinement, the length of the control mark can be halved as compared with a conventional control mark having only one parallel line of the second color separation. Then, too, at least one of the at least two parallel lines of the second color separation is always still located within the pattern having the parallel lines of the first color separation, so that it is possible to read off the positional deviations between the two color separations.

Advantageously, provision is additionally made for one parallel line of the second color separation to be identified visually on the printing material with a different symbol than the second parallel line of the second color separation. By means of the different identification of the two parallel lines of the second color separation, positive and negative deviations from the optimum position of the color separations can be distinguished from one another without doubt. The identification with unambiguous symbols leads to an erroneous entry into the color register and position register setting device in the press being avoided. The use of symbols having an appropriate mathematical reference proves to be particularly advantageous. In this case, provision is made for the symbol of the first parallel line of the second color separation to be a minus sign and for the symbol of the second parallel line of the second color separation to be a plus sign. In this case, the printer enters into the press control system the appropriate sign from that line of the second color separation which is still located within the pattern having the parallel lines of the first color separation. This reliably prevents an erroneous entry of the positional deviation and thus worsening instead of improvement of the color and position register setting in the press.

In accordance with an additional feature of the invention, two control marks are arranged perpendicular to each other on the printing material. By using the perpendicular arrangement of two control marks, it is possible to read off deviations in the lateral and circumferential direction. As compared with conventional control marks, it is then possible to apply two control marks perpendicular to each other for the detection of positional deviations in two directions on the previous area of one control mark for the detection of positional deviations in one direction. This is possible only because of the reduced space required by the control mark according to the invention. For instance, instead of one control mark having a length of four millimeters, it is now possible for two control marks having a length of two millimeters to be applied. Furthermore, it is also possible for there to be a plurality of control marks in the circumferential direction and lateral direction on the printing material, in order to be able to detect positional deviations in the color separations caused by the paper expansion in the printing process.

In accordance with another feature of the invention, provision is made for the control mark to have a first pattern having parallel lines of the first color separation and, arranged perpendicular thereto, a second pattern having parallel lines of the first color separation and, in each case printed in parallel over the two patterns, at least two first parallel lines of the second color separation and, perpendicular thereto, at least two second parallel lines of the second color separation. In this case, the control marks for the detection of the positional deviation in the lateral and circumferential direction can be combined in a single control mark, which needs no more space than a control mark for the detection of the positional deviation in only one direction. In this embodiment, for this purpose the pattern of the standard color and the parallel lines of the color separations are printed directly over one another. Owing to the different colors of the color separations, however, the parallel lines of the further color separations can be detected visually without difficulty. Such a control mark can thus be built up compactly. For this purpose, the central lines of the two patterns of the first color separation of the standard color can cross at right angles. The other lines of the two patterns of the standard color, arranged perpendicular to one another, do not have to cross but can instead form a 90° angle. This results in a particularly compact control mark for the detection of positional deviation in the circumferential and lateral direction.

Other features which are considered as characteristic for the invention are set forth in the appended claims.

Although the invention is illustrated and described herein as embodied in a compact register mark, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
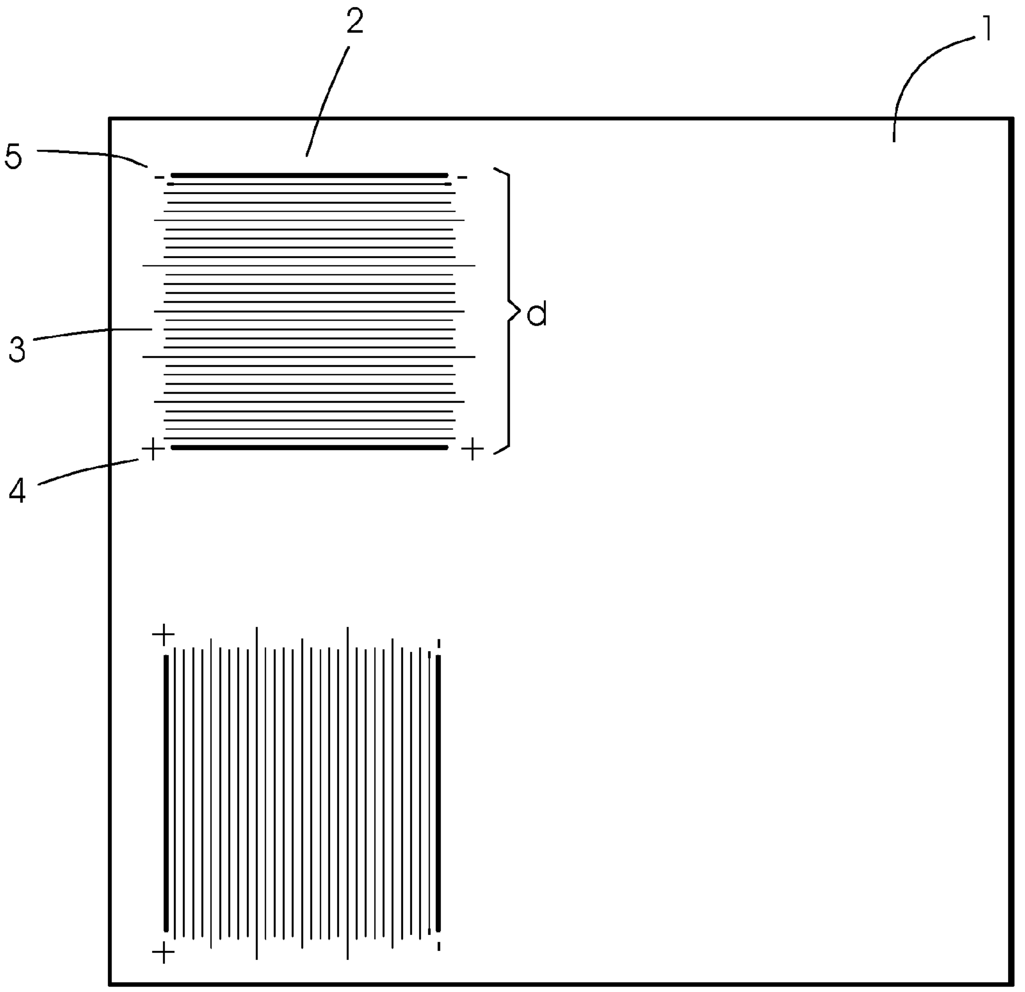
FIG. 1 shows a sheet printing material having a control mark for the detection of positional deviations in the circumferential direction and a control mark for the detection of positional deviations in the lateral direction.

Referring now to the figures of the drawing in detail and first, particularly, to FIG. 1 thereof, there is shown a sheet printing material 1, on which two register marks 2 according to the invention are shown in an enlarged illustration. The register marks 2 are normally located in the marginal areas of the printed image on the printing material 1. Furthermore, such register marks 2 can also be located in the printed image between a number of blanks. In order also to be able to read off the paper expansion during the printing process, a plurality of register marks 2 are usually applied distributed over the entire length and width of the printing material 1. The register mark 2 according to the invention in FIG. 1 is illustrated by way of example for two-color printing but can be expanded to as many color separations as desired and therefore any desired multicolor print. The basis of the register mark 2, as in the case of the conventional register marks, is a parallel line pattern 3 of so-called standard color. The standard color is usually the color black, which is applied to the printing material 1 in a printing unit of a press. The lines of the parallel line pattern 3 have equidistant spacings and serve as a measuring scale. The parallel line pattern 3 in FIG. 1 extends over a length d of two millimeters. Although the register mark 2 has a length d of only two millimeters, overall register deviations of ±two millimeters, which means a total of four millimeters, can be displayed visually, as in the case of conventional register marks four millimeters long. This is done by means of the positive lines 4 and negative lines 5 shown of the color to be controlled.

The two lines 4, 5 in this case have the same color and are kept in the second color to be controlled in the case of two-color printing. Furthermore, each of the two lines 4, 5 is identified unambiguously by a symbol, the upper negative line 5 being identified by a minus sign and the lower positive line 4 by a plus sign. In the case of the register marks 2 shown in FIG. 1, the register is set perfectly, which can be seen from the fact that the positive and negative line 4, 5 in each case coincide exactly with the upper and lower end of the register mark 2.

Figure 2:
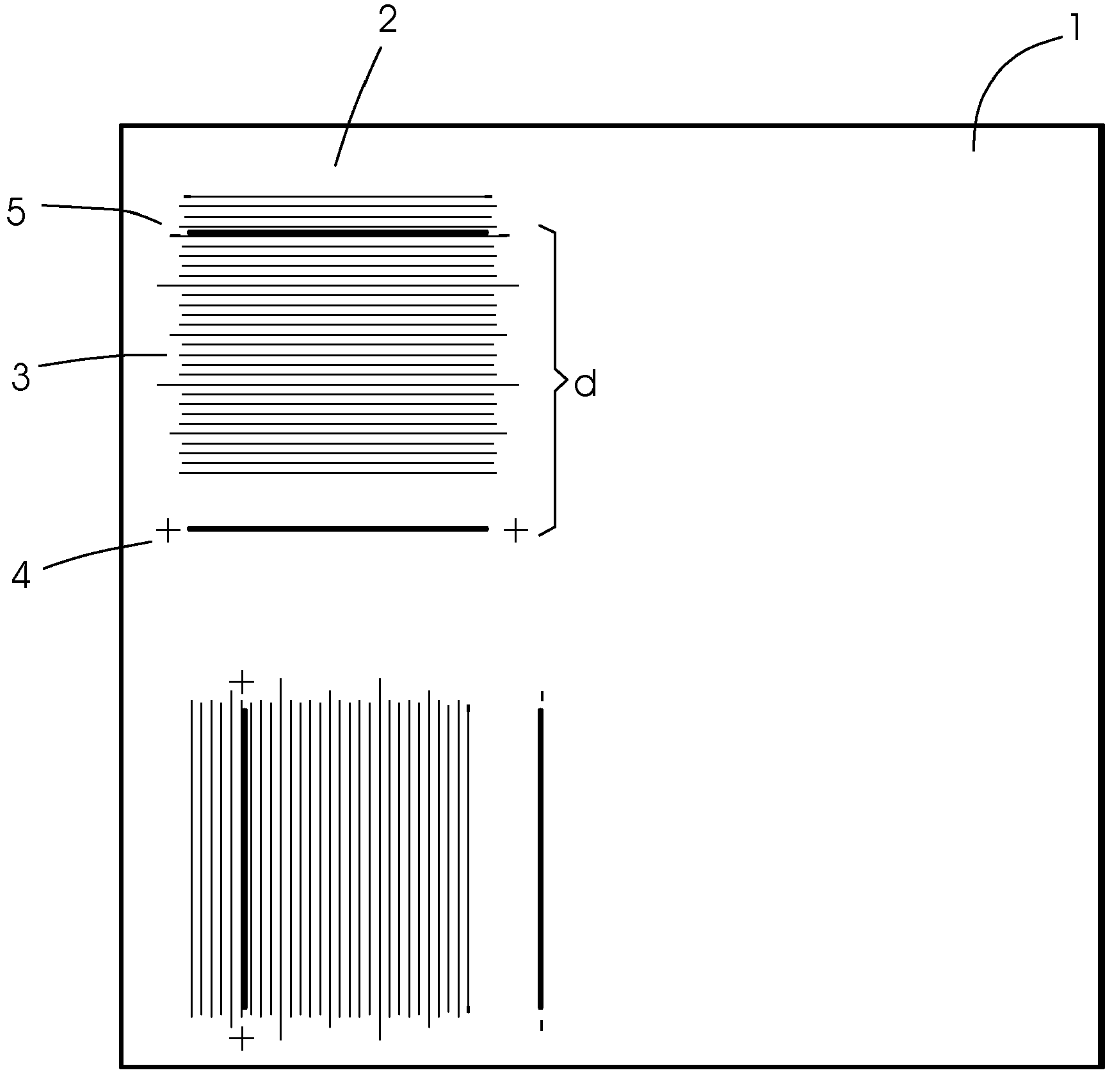
FIG. 2 shows control marks according to the invention in the case of positional deviations in the circumferential correction and in the lateral direction.

If, then, a positional deviation results between the color separations, one of the two lines 4, 5 wanders out of the parallel line pattern 3 of the standard color, while the other line correspondingly wanders in. This is depicted in FIG. 2; here there is a negative deviation in the circumferential direction and a positive deviation in the lateral direction. In this case, the two lines 4, 5 have the same spacing d as the length of the parallel line pattern 3. If the positive line 4 of the color to be controlled wanders into the parallel line pattern 3, then there is a positive positional deviation from the ideal overprinting of the two color separations; in the other case there is a negative deviation. This deviation can be read off by the printer and then entered with the appropriate associated sign into the color register or position register adjusting device of the press. Owing to the unambiguous identification of the deviations with plus or minus sign, the printer is prevented from entering an erroneous sign into the color register or position register control system of the press and thus not minimizing but enlarging the positional deviation. In order to be able to detect the positional deviation both in the lateral and in the circumferential direction, in FIG. 1 the two register marks 2 are arranged to be offset by an angle of 90° from each other.

Figure 3:
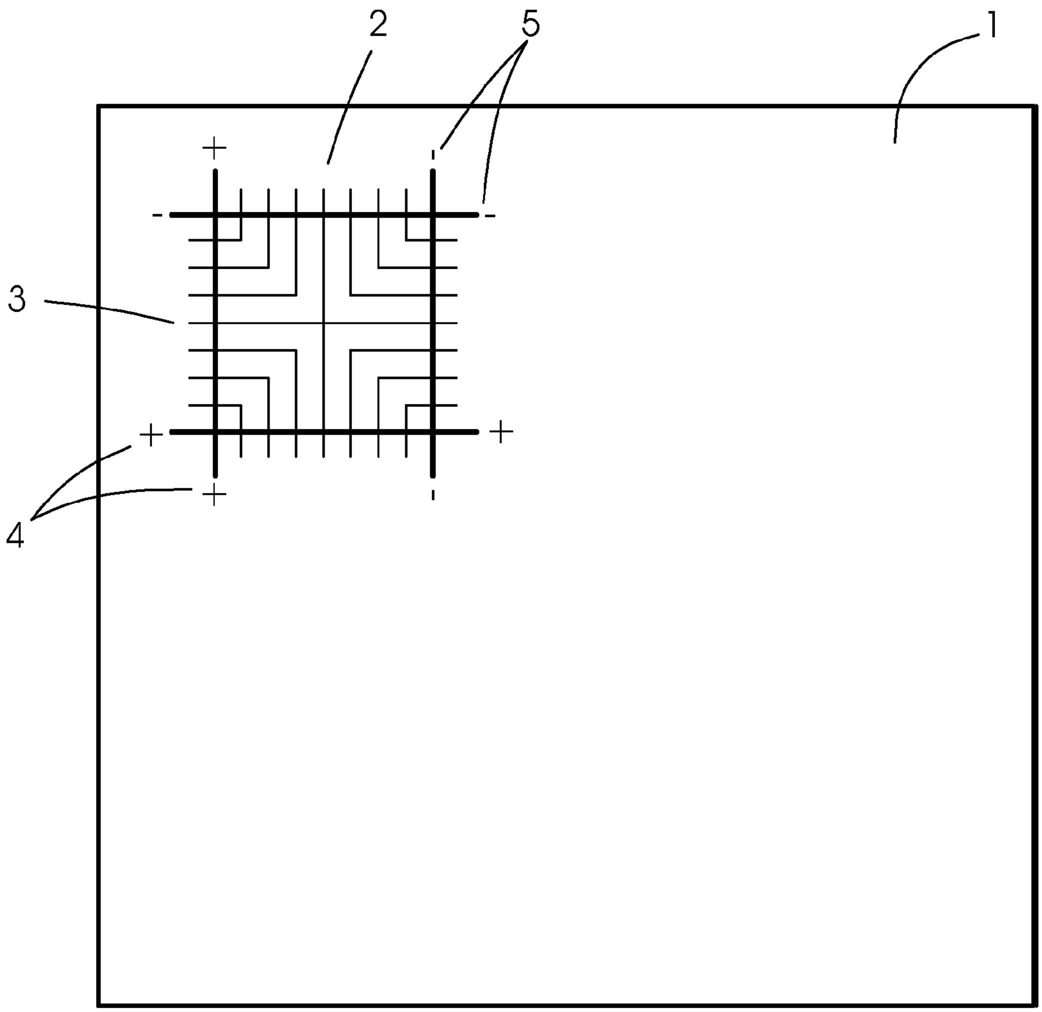
FIG. 3 shows a particularly compact control mark for the detection of positional deviations in the lateral and circumferential direction.

In FIG. 3, a space-saving register mark 2 is depicted, which permits the positional deviations of color separations to be read off both in the circumferential and in the lateral register direction, although it needs only exactly the same amount of space as a single register mark 2 in FIG. 1. To this end, in FIG. 3 two parallel line patterns 3 of the standard color are overprinted with point and mirror symmetry at an angle of 90° in relation to each other, only the central lines of the two parallel line patterns 3 crossing, while the other lines are implemented as 90° angles. Equally well, however, the lines could also be continuous and could cross; the implementation as 90° angles is used only for improved legibility, since in this case fewer crossing lines permit improved clarity. Matching this, the positive and negative lines 4, 5 of the color to be controlled are overprinted at the 90° angle both in the lateral direction and in the circumferential direction and superimposed on the two overprinted parallel line patterns 3 of the standard color. Here, too, in the case of a positive deviation the positive lines 4 wander into the register mark 2, while the negative lines 5 wander out. In the case of a negative deviation of the color separations in relation to one another, the negative lines 5 correspondingly wander into the register mark 2 and the positive lines 4 wander out of the register mark 2. With the register mark 2 according to the invention according to FIG. 3, the space required is halved again with respect to the register mark 2 according to the invention in FIG. 1, since here there is only a mark having a length and width d of two millimeters, for example, for the detection of positional deviations both in the circumferential and in the lateral direction. As compared with conventional register marks having an extent of four millimeters for the detection of equally large deviations, which marks have to be present twice in order to detect positional deviations in the circumferential and lateral register direction, the result in the case of the register mark 2 according to FIG. 3 is thus a requirement for space reduced to one quarter.

The invention claimed is:

1. A control mark for detecting positional deviations between at least two color separations printed over one another on a printing material in a multicolor printing process, the control mark comprising:

a pattern having a plurality of mutually parallel lines of a first color separation arranged to form a readable scale; and at least two mutually parallel lines of a second color separation printed in parallel over said pattern, said at least two parallel lines of the second color separation being spaced from one another at a spacing distance equal to a length of said pattern having the parallel lines of the first color separation.

2. In combination with a printing material in a printing process, two control marks each according to claim 1, applied to the printing material and arranged in a respective perpendicular orientation.

3. The control mark according to claim 1, wherein the length of the pattern having the parallel lines of the first color separation is less than or equal to 2 mm.

4. The control mark according to claim 1, which comprises a multiplicity of said control marks according to claim 1 arranged many times on the printing material in a circumferential direction or a lateral direction thereof.

5. A control mark for detecting positional deviations between at least two color separations printed over one another on a printing material in a multicolor printing process, the control mark comprising:

a pattern having a plurality of mutually parallel lines of a first color separation arranged to form a readable scale; and at least two mutually parallel lines of a second color separation printed in parallel over said pattern, said at least two mutually parallel lines of the second color separation including a first parallel line and a second parallel line, and said first parallel line being visually identified on the printing material with a different symbol from said second parallel line.

6. The control mark according to claim 5, wherein the symbol of said first parallel line of the second color separation is a minus sign, and the symbol of said second parallel line of the second color separation is a plus sign.

7. A control mark for detecting positional deviations between at least two color separations printed over one another on a printing material in a multicolor printing process, the control mark comprising:

a first pattern having a plurality of mutually parallel lines of a first color separation arranged to form a readable scale;

at least two mutually parallel lines of a second color separation printed in parallel over said pattern; and a second pattern, arranged perpendicular to said first pattern, having parallel lines of the first color separation and, in each case printed in parallel over said first and second patterns, at least two first parallel lines of the second color separation and, perpendicular thereto, at least two second parallel lines of the second color separation.

8. The control mark according to claim 7, wherein the control mark is built up symmetrically.

9. The control mark according to claim 7, wherein respective central lines of said first and second patterns of the first color separation cross at right angles.

10. The control mark according to claim 9, wherein said first and second patterns include said central lines crossing at right angles and other lines formed with a 90° angle and not crossing one another.

* * * * *